(12) United States Patent
Barber

(10) Patent No.: US 6,921,520 B2
(45) Date of Patent: Jul. 26, 2005

(54) PROCESS FOR UPGRADING RAW PHOSPHATE ORE

(75) Inventor: James C. Barber, Florence, AL (US)

(73) Assignee: James C. Barber and Associates Inc., Florence, AL (US)

( * ) Notice: Subject to any disclaimer, the term of this patent is extended or adjusted under 35 U.S.C. 154(b) by 230 days.

(21) Appl. No.: 10/265,485

(22) Filed: Oct. 7, 2002

(65) Prior Publication Data

US 2004/0067187 A1 Apr. 8, 2004

(51) Int. Cl.$^7$ .............................................. C01B 25/00
(52) U.S. Cl. ...................................... 423/317; 423/323
(58) Field of Search ................................ 423/314, 317, 423/321.1, 322, 323, 157

(56) References Cited

U.S. PATENT DOCUMENTS 4,919,906 A * 4/1990 Barber ....................... 423/323

* cited by examiner

*Primary Examiner*—Steven Bos
*Assistant Examiner*—Maribel Medina
(74) *Attorney, Agent, or Firm*—James H. Knebel

(57) ABSTRACT

The present invention is a process for upgrading feedstock prepared from raw phosphate ore. Phosphorus sludge is burned to produce impure phosphoric acid and the acid is combined with beneficiated phosphate ore to prepare anhydrous monocalcium phosphate. Feedstock prepared from raw phosphate ore is blended with anhydrous monocalcium phosphate to upgrade the feedstock.

6 Claims, 2 Drawing Sheets

PROCESS FOR UPGRADING RAW PHOSPHATE ORE

BACKGROUND OF THE INVENTION

The Tennessee Valley Authority (TVA) undertook a program of research, development, and production of phosphate fertilizers soon after the agency was created by an Act of Congress in May, 1933. TVA's fertilizer program entailed phosphorus furnace smelting of phosphate ore that was available from deposits in middle Tennessee. The mineral is fluorapatite and in igneous and metamorphic deposits it is represented by the formula $Ca_{10}(PO_4)_6F_2$. The middle Tennessee deposits, however, are sedimentary, and they differ markedly from fluorapatite. The mineral is micro-crystalline and there is extensive substitutions of carbonate and fluorine for phosphate. The mineral in middle Tennessee deposits is called carbonate apatites or francolite.

In a TVA publication (*Agglomeration of Phosphate Fines for Furnace Use*, E. L. Stout, Chemical Engineering Report No. 4, 1950) it was reported that while two large-scale phosphorus furnaces were under construction, arrangement were made to secure natural lump phosphate from middle Tennessee deposits for smelting. Feed material for phosphorus furnaces must be in lump form. In the course of handling and drying this lump material, it was known that phosphate fines would be produced. The small sized phosphate could be ground to powder and acidulated with phosphoric acid to produce concentrated superphosphate fertilizer. The mining operation and prospecting carried on in middle Tennessee indicated that the supplies of lump rock from this source were being depleted rapidly and soon would be unavailable. Furthermore, several thousand tons of excess fines accumulated at the TVA plant in 1935.

TVA had to abandon plans to smelt naturally occurring lump phosphate as stated in Chemical Engineering Report No. 4.

"Since it was evident that the supply of natural lump rock that could be obtained in Tennessee was insufficient for continued large-scale furnace operation, it became necessary to consider methods for the agglomeration of the phosphate matrix [raw phosphate ore] or phosphate sands [beneficiated phosphate ore]. Several rotary lime kilns were on hand at Nitrate Plant No. 2 which had been built during World War I and had been turned over to TVA in 1933. Consideration was given to agglomeration of phosphate fines in these kilns by heating the fines to incipient fusion so that they would stick together because of the rotation of the kiln and would form nodules. After the process was studied on a small scale, agglomeration was carried out successfully in the lime kilns. The process called "nodulizing" has been used in the TVA plant since 1936 as a method for agglomerating phosphate fines for use in furnace charges."

Land in Maury County, Williamson County and Giles County in middle Tennessee had deposits of the mineral fluorapatite and TVA procured mineral rights in the three counties. Equipment was installed in Maury County to beneficiate the ore by hydrometallurgical separations; most of the clay in the ore was removed by washing and phosphate grains, called phosphate sand, were recovered. The beneficiated phosphate ore was heated in rotary kilns to the temperature range of 2600° to 2700° F. Clay remaining in the beneficiated ore after hydrometallurgical separations was melted and provided a liquid phase that served as a binder to agglomerate the small particles. Raw phosphate ore contained more clay and it was agglomerated by heating in the temperature range of 2200° to 2350° F.

In 1935 and 1936 prior to the operations of facilities to beneficiate raw phosphate ore, the feedstock at TVA was naturally occurring lump phosphate ore containing 31 to 33 percent $P_2O_5$. In 1937, 24.5 percent was lump phosphate and in 1938 only 6.1 percent was lump phosphate. Thus the change from lump phosphate to nodulized phosphate sand was completed in 1938.

A typical composition of feedstock prepared by agglomerating phosphate sand is given in Table 1.

TABLE 1

Typical Composition of Nodulized Phosphate Sand[@]

| Constituent | Percent |
| --- | --- |
| Moisture | 0.0 |
| $P_2O_5$ | 27.5 |
| CaO | 39.0 |
| $SiO_2$ | 24.1 |
| $Fe_2O2$ | 3.3 |
| $Al_2O_3$ | 4.2 |
| F | 2.2 |
| $K_2O$ | 0.8 |
| MgO | 0.3 |
| $MnO_2$ | 0.3 |
| $Na_2O$ | 0.6 |
| S | 0.0 |

[@]Raw phosphate ore was beneficiated by hydrometallurgical separation to remove most of the clay to obtain phosphate sand; beneficiated raw phosphate ore was heated in a rotary kiln to agglomerate the ore for phosphate furnace feedstock.

As shown in Table 1 the nodulized phosphate sand contained 27.5 percent $P_2O_5$, as compared with 31–33 percent $P_2O_5$ for natural lump feedstock. The smelting characteristics of natural lump phosphate and nodulized phosphate sand was reported in a TVA publication, *Production of Elemental Phosphorus by the Electric-Furnace Method*, R. B. Burt and J. C. Barber, Chemical Engineering Report No. 3, Tennessee Valley Authority, 1952.

"When the phosphate was nodulized or sintered [agglomerated by heating on a traveling grate], the moisture, sulfur, carbon dioxide, organic matter, and 35 to 40 percent of the fluorine was volatilized. Although the nodules and sinter were porous and their structures appeared to be somewhat weak, furnace operation with these materials was markedly superior to the operation with uncalcined phosphate feeds [natural lump phosphate]. Furnace draft control was improved significantly when the nodules or sinter was fed; there was more uniform movement of charge in the furnace as a result of the absence of crusting and the minimum formation of fines. During tests at the original No. 2 furnace the furnace-gas temperatures were approximately 300° F. lower when nodules or sinter was used than they had been when uncalcined Tennessee phosphate (plate brown rock or broken rock) was fed. The electrical energy requirement was 10 to 15 percent less for the nodulized feed than it was for uncalcined Tennessee phosphate; this was a result of the improved furnace operation and the higher grade of the nodulized material. A decrease in electrical energy requirement of this magnitude was not realized when sinter was fed because the sinter was prepared from the mixture of washed phosphate sand and matrix [raw phosphate ore], and the $P_2O_5$ content of this material was lower than that of the nodules or uncalcined rock phosphate normally fed to the furnace."

The "grade" referred to above was the percent $P_2O_5$ in the phosphate-plus-silica rock. Beneficiation of raw phosphate ore by washing did not separate silica and the nodulized material contained 24.1 percent $SiO_2$, as shown in Table 1. The $SiO_2$ content of lump phosphates varied from 7.8 to 11.4 percent and more silica rock was added to the furnace burden for a flux than for raw phosphate ore that was beneficiated by washing. Thus the percent $P_2O_5$ in the phosphate-plus-silica rock was higher for nodulized feed than it was for the "uncalcined Tennessee phosphate" which was lump phosphate.

TVA washed raw phosphate and separated clay from the ore by hydrometallurgy. The beneficiated ore was agglomerated by heating in rotary kilns to obtain feedstock for smelting in phosphorus furnaces. However, raw phosphate ore that was amenable to beneficiation in Maury County and Williamson County was exhausted by 1950; excessive quantities of mineral fluorapatite were lost when clay was separated. Furthermore, mud ponds containing the clay were water pollution hazards.

TVA endeavored to smelt raw phosphate ore that had been nodulized, but the operating characteristics of the phosphorus furnace were unsatisfactory. The furnace pressure fluctuations and gas temperatures were excessive and the slag was difficult to tap. Operation of the furnace was satisfactory when the percent $P_2O_5$ in the phosphate-plus-silica was 25–26, or greater. With unbeneficiated phosphate ore the percent $P_2O_5$ in the phosphate-plus-silica was in the range of 22–24. Florida hard rock containing 35.4 percent $P_2O_5$ was smelted at TVA without calcining or agglomeration to investigate its smelting characteristics. The $P_2O_5$ in the phosphate-plus-silica was 25.6 percent. The smelting characteristics of phosphate sand were compared with the smelting characteristics of phosphate sand that had been nodulized.

Results of tests comparing the smelting characteristics of the two feedstocks were reported in Chemical Engineering Report No. 3 as follows.

"The feeding of uncalcined Florida hard rock was tested at the modified No. 2 furnace, and the results of this test were compared with those of a preceding test in which nodulized Tennessee phosphate was used as a feed. Furnace operation was more erratic during the Florida hard rock test than it was during the nodulized phosphate test; the furnace pressure fluctuations were greater; the slag was more viscous and harder to tap; and precipitator operations were unsatisfactory. Deposits accumulated on the wires and frames of the precipitator after about 1 month's time and caused electrical short circuits which were not readily remedied by shaking or vibrating the frames. Inspection showed that some of the deposits were crystalline projections extending horizontally from the wires, and analysis showed that they consisted principally of $P_2O_5$ and $SiO_2$. Although precipitator operating difficulties increased when hard rock was fed, the quantity of dust removed by the precipitator was only about half as much as was removed when nodules were fed. Precipitator operating difficulties similar to those encountered with hard rock were also encountered during tests with uncalcined Florida pebble; however, they were not as serious. These results indicate that these conditions (and the accompanying erratic furnace operation) are characteristics of the use of uncalcined phosphates as furnace feed."

Based on findings at TVA, feedstock for the electric furnaces should have at least 25 percent $P_2O_5$ in the phosphate-plus-silica for satisfactory operation of the furnace. If the furnace is equipped with electrostatic precipitators the weight ratio of fluorine to $P_2O_5$ should be a maximum of 0.089 to avoid accumulation of crystalline deposits on the wires and frames of the electrostatic precipitators. Florida hard rock was a sedimentary deposit with a ratio of F to $P_2O_5$ of about 0.110 and after TVA smelted the feedstock for one month accumulations of crystalline deposits on the wires and frames impaired dust collection and increased the proportions of elemental phosphorus that was recovered as phosphoric sludge. The composition of nodulized phosphate sand given in Table 1 show this feedstock contained 2.2 percent F and 27.5 percent $P_2O_5$ for a $F/P_2O_5$ of 0.080. The crystalline solids containing F and $P_2O_5$ did not accumulate on the wires and frames when nodulized phosphate sand was the feedstock.

TVA mined and beneficiated phosphate ore from mineral deposits in Maury and Williamson Counties in middle Tennessee until 1950. The raw phosphate ore was beneficiated by washing to remove clay and obtain phosphate sand which was nodulized to obtain feedstock having the composition shown in Table 1. Phosphate ore amenable to beneficiation by washing became exhausted. Losses of fluorapatite mineral that were washed out with clay were excessive. Furthermore, mud ponds were water pollution hazards.

The raw phosphate ore contained sufficient clay binder for agglomeration by heating in the temperature range of 2200° to 2350° F. Most of the clay in raw phosphate ore was washed out to prepare phosphate sand and it had to be heated to 2500° to 2700° F. for agglomeration. At TVA raw phosphate ore was agglomerated by heating in rotary kilns and it was agglomerated by heating in a traveling-grate kiln.

About 35 percent of the fluorine in phosphate sand was volatilized when it was agglomerated at 2600° to 2700° F. The $F/P_2O_5$ ratio in the feedstock was 0.080 as determined from Table 1 and 91.4 percent of the F was recovered in the slag when the feedstock was smelted. Accumulations of crystalline deposits on the wires and frames in the electrostatic precipitators was not a problem.

About 8 percent of the fluorine in raw phosphate ore was volatilized when it was agglomerated by heating to 2200 to 2350 F. The $F/P_2O_5$ ratio in the feedstock was 0.095 to 0.100 and a shut-down was required at frequencies of about three months for manual removal of the crystalline accumulations on the wires and frames. Electrostatic precipitators are not considered worthwhile if the phosphate ore is agglomerated by heating in the range of 2200° to 2350° F.

TVA smelted raw phosphate ore that was mined in Maury and Williamson Counties in Tennessee but the feedstock had to be upgraded by purchased flotation concentrate mined in Florida. The raw phosphate ore was beneficiated by washing, screening, and flotation to obtain flotation concentrate containing 30 to 32 percent $P_2O_5$. Flotation concentrate was incorporated in raw phosphate ore from deposits in middle Tennessee and the mixture was agglomerated by heating in rotary kilns and it was agglomerated by heating in a traveling-grate calciner. The cost of flotation concentrate was significantly higher than the cost of raw phosphate ore mined in middle Tennessee and freight costs from south Florida to north Alabama was more than the cost of the flotation concentrate. TVA demonstrated that raw phosphate ore could be smelted by upgrading feedstock to about 25 percent $P_2O_5$ in the phosphate-plus-silica but it was evident a lower cost process for upgrading the feedstock was needed.

When TVA stopped producing elemental phosphorus in 1976 the agency had mineral rights on phosphate land in Giles County, Tennessee. The mineral rights were sold to a company producing elemental phosphorus but I understand the land owners now possess mineral rights. The percent $P_2O_5$ and tons of raw phosphate ore on the various tracts in Giles County are in Table 2.

TABLE 2

Giles County Phosphate Property

| Name of Tract | $P_2O_5$ in Percent | Tons of Raw Phosphate Ore |
|---|---|---|
| McMillon, Harvey W. | 23.6 | 478,000 |
| Consolidated Phosphate Co. (Brown) | 23.0 | 200,350 |
| Consolidated Phosphate Co. (Kincaid-Hill) | 21.9 | 673,950 |
| Foster, E. V. (Davis) | 23.1 | 160,300 |
| Dunlap, T. F. | 22.0 | N.A. |
| Dunlap, T. F. | 22.0 | 120,000 |
| Gordon, L. R. | 22.5 | N.A. |
| Gordon, L. R. | 22.5 | 338,000 |
| Poorch, W. E. | 23.4 | 389,100 |
| Opton, R. W. | 22.6 | 893,100 |
| Clark, J. T. and G. N. | 22.2 | 198,000 |
| Childers, Mrs. Ben | 24.9 | 558,500 |
| Dunlap, W. P. | 22.2 | 286,200 |
| Smith, J. P. | 23.6 | 82,900 |
| Upton, L. Q. (Whitworth and King) | 21.6 | 532,000 |
| Yokley, John T. | 21.1 | 450,500 |
| Whitworth, W. T. | 21.8 | 99,000 |
| Burgess, M. G. | 21.8 | 862,250 |
| Burgess, L. B. | 19.5 | 494,500 |
| Robinson, Robert | 20.6 | 191,600 |
| Harwell, Riggs | 20.1 | 102,800 |
| Phillips, Henry | 20.5 | 288,000 |
| Upton and Keller | 20.5 | 1,197,152 |
| Topp, Gordon | 18.6 | 257,300 |
| Burton, William R. | 19.8 | 126,360 |
| Lanier, C. W. | 19.6 | 133,600 |
| Smith. D. A. | 21.3 | 193,100 |

N.A.: Not Available

As shown in Table 2 the $P_2O_5$ content of the various tracts varied from 18.6 to 24.9 percent and the weighted average was 20.82 percent $P_2O_5$. Phosphatic feedstocks, or mixtures of phosphatic feedstocks, should contain a minimum of about 25 percent $P_2O_5$ in the phosphate-plus-silica. The Giles County deposits are virtually self-fluxing; that is, the phosphate ore contains enough silica to combine with the CaO and $Al_2O_3$ to form a fluid slag and the percent $P_2O_5$ reported in Table 2 is the approximate percent $P_2O_5$ in the phosphate-plus-silica.

At TVA feedstock prepared from phosphate sand had a percent $P_2O_5$ in the phosphate-plus-silica of 25.8 and feedstock prepared from Florida pebble had a percent $P_2O_5$ in the phosphate-plus-silica of 25.4.

The primary object of my invention is to devise a practical, low-cost process for upgrading feedstock prepared from raw phosphate ore obtained by mining phosphate ore in Giles County, Tennessee, and Limestone County, Alabama. However, the invention may be applicable for upgrading feedstock prepared from other deposits of phosphate ore.

DISCLOSURES OF THE INVENTION

Gas is generated in the electric furnace when phosphatic feedstock is smelted to produce phosphorus. The furnace gas consists primarily of carbon monoxide and phosphorus vapor, and it is normally contacted with water to condense the elemental phosphorus by adiabatic cooling to obtain yellow phosphorus. However, some of the phosphorus vapor condenses as an emulsion called phosphorus sludge and it consists of particles Of phosphorus, inorganic solids, carbon and water.

At TVA phosphorus sludge was burned to form $P_2O_5$ and the $P_2O_5$ was combined with water to obtain impure phosphoric acid ($H_3PO_4$) containing inorganic solids and carbon. Although the impure phosphoric acid could be used to produce some fertilizers, it could not be used to produce fluid fertilizers. Furthermore, inorganic solids, carbon, and water in phosphorus sludge interfered with the oxidation of elemental phosphorus to $P_2O_5$. When the elemental phosphorus content of phosphorus sludge was less than about 60 percent the phosphorus was incompletely oxidized; some $P_2O_5$ was formed and it combined with water to form phosphorous acid ($H_3PO_3$). The incompletely oxidized elemental phosphorus was phytotoxic and phosphorus sludge containing less than about 60 percent elemental phosphorus was not usable for the production of fertilizer. Phosphorus sludge containing less than about 60 percent elemental phosphorus accumulated as a phosphorus-containing waste.

Although TVA successfully burned phosphorus sludge containing a minimum of 60 percent elemental phosphorus to produce impure orthophosphoric acid, TVA needed highly concentrated phosphoric acid with low impurities content and a stainless steel facility was constructed to produce the highly concentrated phosphoric acid. The phosphoric acid was used to produce clear fluid fertilizer containing ammonium tripolyphosphate.

FIG. 1 is a cone mixer disclosed in "Method for the Manufacture of Superphosphate," U.S. Pat. No. 2,528,514, Stewart A. Harvey and Grover L. Bridger, Nov. 7, 1950. The cone mixer was widely used by the fertilizer industry and it continues to be preferred for mixing phosphate and phosphoric acid to produce monocalcium phosphate monohydrate.

Claims in U.S. Pat. No. 6,051,201, Preparation of Phosphatic Feedstock from Phosphorus Containing Waste," disclose a process for heating phosphorus-containing waste to vaporize liquid phosphorus and convert white phosphorus to red phosphorus. Residue obtained from heating the phosphorus sludge is agglomerated and smelted in a phosphorus furnace and accumulated phosphorus sludge can be recycled.

The present invention is a process for recycling phosphorus-containing waste and feedstock prepared from raw phosphate ore mined in Giles County, Tennessee, can be upgraded to a minimum of 25 percent $P_2O_5$ in the phosphate-plus-silica. Only white phosphorus containing less than 2 percent impurities will be produced and the phosphorus can be burned in a stainless steel phosphoric acid production facility without corrosion of the stainless steel.

The recycle process disclosed in the present invention is based on TVA's research and development on the production of concentrated superphosphate fertilizer. Beneficiated phosphate ore was acidulated with orthophosphoric acid to produce the fertilizer. Table 3 is from the TVA publication titled, "Development of Processes for Production of Concentrated Superphosphate," Chemical Engineering Report No. 5, Tennessee Valley Authority, G. L. Bridger, 1949.

Phosphorus in the fluorapatite mineral is converted into monocalcium phosphate monohydrate ($CaH_4(PO_4)_2.H_2O$) when the phosphate ore is acidulated with orthophosphoric acid. For production of concentrated superphosphate fertilizer, the acidulated material was stored 2 to 3 months to decrease the free acid and moisture contents and increase the conversion of insoluble fluorapatite to monocalcium phosphate monohydrate.

In Table 3 the total $P_2O_5$ content of the acidulated material was 49.2 percent and this was 2.4 times the weighted average $P_2O_5$ content in raw phosphate ore that can be mined in Giles County, Tennessee. Furthermore, the acidulated material contained 1.74 percent F and this is 21 percent below the F in nodulized phosphate sand (Table 1). The $F/P_2O_5$ weight ratio in nodulized phosphate sand was 0.080 and 91.4 percent of the fluorine was found in slag; 9.1 percent was found in the phosphorus sludge as reported on page 168 in "Production of Elemental Phosphorus by the Electric Furnace Method," Chemical Engineering Report No. 3, Tennessee Valley Authority, R. H. Burt and J. C. Barber, 1952.

TABLE 3

COMPOSITION OF SUPERPHOSPHATES PREPARED FROM
TENNESSEE BROWN ROCK PHOSPHATES AND VARYING
PROPORTIONS AND CONCENTRATIONS OF PHOSPHORIC ACID
(TABLE IV IN CHEMICAL ENGINEERING REPORT NO. 5)

| | |
|---|---|
| Acid concentration, percent $H_3PO_4$ | 75.0 |
| Mole ration, $P_2O_5$/CaO | 0.82 |
| Ratio, $P_2O_5$ from acid/$P_2O_5$ from rock | 1.92 |
| Period stored, days | 15.0 |
| Loss in weight, percent | 6.7 |
| Moisture, percent | 3.3 |
| $P_2O_5$ content, percent | |
| Total | 49.2 |
| As free acid | 1.6 |
| Water soluble | 41.0 |
| Available | 48.2 |
| CaO content, percent | 23.8 |
| F content, percent | 1.74 |
| Conversion, percent | 94.0 |
| Acid Consumption, | 0.671 |
| $P_2O_5$ from acid/available $P_2O_5$ in superphosphate | |

In lieu of storage for 2 to 3 months, TVA investigated the "Quick-Curing Process," described in Chapter VI in "Development of Process for Production Of Concentrated Superphosphate." Acidulated material was heated to 150° F. but the material contained three percent moisture after heating. The temperature was limited to 150° F. to prevent soluble $P_2O_5$ from reverting to insoluble $P_2O_5$. Reversion of $P_2O_5$ will not be a problem if the acidulated material is used as a feedstock in electric furnaces. The acidulated material should be heated to 225° to 250° F. to assure anhydrous monocalcium phosphate is obtained. Water added to the electric furnace is a safety hazard because immense volumes of steam are generated. Moisture in the reducing carbon, silica rock, and phosphatic feedstock is reduced by carbon to form carbon monoxide and hydrogen thereby consuming carbon and electric energy.

The formula for anhydrous monocalcium phosphate in handbooks is $Ca(H_2PO_4)_2$ and it can be represented by the formula $CaO.P_2O_5.2H_2O$. In "Development of Process for Production of Concentrated Superphosphate," page 117, $CaO.P_2O_5.2H_2O$ is attained by heating to about 450° F. and $CaO.P_2O_5.H_2O$ by heating to about 650° F. Calcium metaphosphate, $CaO.P_2O_5$, is formed by heating to 800° F. The combined water is not a safety hazard in the electric furnace but carbon and electric energy are consumed and energy is required to heat anhydrous monocalcium phosphate to temperatures above 225° F.

Disclosures in the invention are summarized as follows:
1. A process is disclosed for recovering and recycling phosphorus-containing waste and eliminating accumulations of the hazardous material. The entire production of elemental phosphorus will be white phosphorus.
2. A process is disclosed for upgrading feedstock prepared from raw phosphate ore. Anhydrous monocalcium phosphate containing about 50 percent $P_2O_5$ is mixed with feedstock prepared from raw phosphate ore containing about 19 to about 25 percent $P_2O_5$.

OBJECTS OF THE INVENTION

The following is a brief summary of the objects of the invention.
1. Provide a process for recycling phosphorus sludge thereby avoiding accumulations of the hazardous waste at sites for the manufacture of elemental phosphorus.
2. Provide a process for upgrading feedstock prepared from raw phosphate ore.

Figure 1:
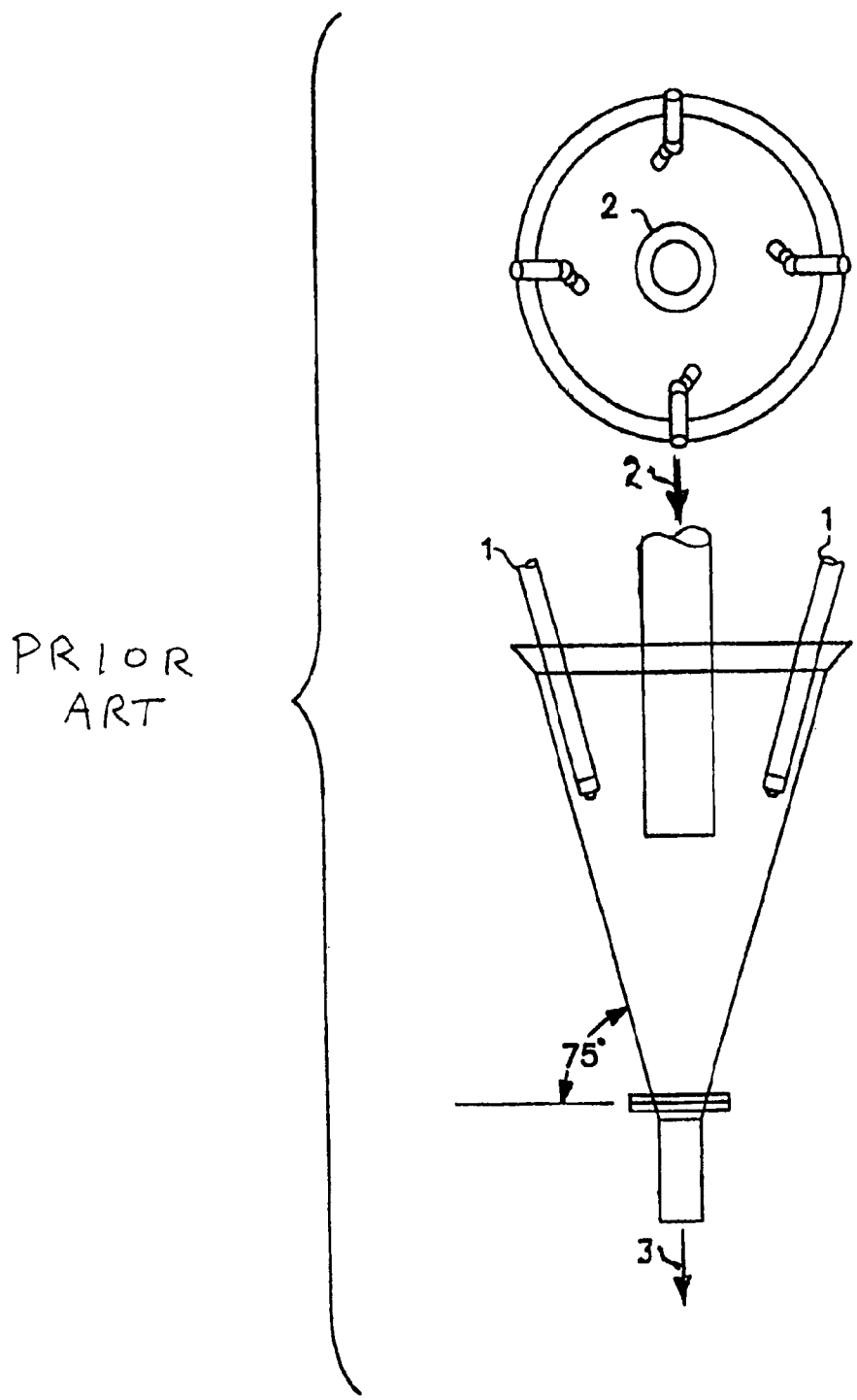
FIG. 1 is a diagram of a TVA cone mixer which was invented to mix phosphoric acid and beneficiated phosphate ore for the production of superphosphate fertilizer (U.S. Pat. No. 2,528,514). Phosphoric acid 1 is injected into the cone-shaped mixer through four nozzles. Beneficiated phosphate ore 2 is added to the mixer through a pipe and the mixture of beneficiated phosphate ore and phosphoric acid 3 is discharged through a nozzle onto a belt conveyor.

Agglomerated phosphate ore 5, reducing carbon 6, silica rock 7, and anhydrous monocalcium phosphate 19 are smelted thereby obtaining slag 8 and ferrophosphorus 9. Both slag and ferrophosphorus are byproducts.

The gaseous mixture of carbon monoxide, hydrogen, and elemental phosphorus 10 is obtained when agglomerated phosphorus ore 5, reducing carbon 6, silica rock 7, and anhydrous monocalcium 19 are smelted. The gaseous mixture is contacted with water 11 to condense elemental phosphorus and a gaseous mixture of carbon monoxide and hydrogen 12 remains. The gaseous mixture is a byproduct and it is used as a fuel. A liquid mixture of water, yellow phosphorus, and phosphorus sludge 13 is discharged from the condenser.

The liquid mixture of water, yellow phosphorus, and phosphorus sludge 13 is washed with water 11 to separate yellow phosphorus from phosphorus sludge and obtain white phosphorus. Furthermore, washing coalesces some of the particles of elemental phosphorus in the liquid mixture of water, yellow phosphorus, and phosphorus sludge 13. White phosphorus 14 containing a maximum of 2 percent impurities can be burned in a stainless steel phosphoric acid production unit and thereby avoid excessive corrosion. Phosphorus sludge 15 is oxidized with air 16 to obtain phosphorus pentoxide ($P_2O_5$) 17. Phosphorus pentoxide 17 is hydrated with water 11 to form phosphoric acid 1.

Phosphoric acid 1 and beneficiated phosphate ore 2 are mixed in the cone mixer shown in FIG. 1. The mixture of beneficiated phosphate ore and phosphoric acid 3 chemically react on a conveyor belt forming a monolithic solid of monocalcium phosphate monohydrate 18. The monocalcium phosphate monohydrate 18 is heated to volatilize water and prepare anhydrous monocalcium phosphate 19. Anhydrous monocalcium phosphate 19 is combined with agglomerated phosphate ore 5, reducing carbon 6, and silica rock 7 to prepare upgraded feedstock for smelting to produce white phosphorus.

PRIOR ART

The first commercially practical electric-furnace process for the production of elemental phosphorus was disclosed in the United States in U.S. Pat. No. 417,943, "Process of Obtaining Phosphorus," Dec. 24, 1889. J. B. Readman was the inventor. Prior art in Readman's patent provides background on upgrading feedstock for smelting phosphoric material and the following was copied from U.S. Pat. No. 417,943.

"In the ordinary method of obtaining phosphorus it is customary to heat the selected and prepared phosphatic materials to a high temperature in fire-clay or earthenware cylinders or retorts by means of an external fire consuming solid or gaseous carbonaceous fuel. The material introduced into the retort is generally a desiccated mixture of crude phosphoric acid or acid phosphate of lime intimately mixed when in solution with charcoal, coke, or other carbonaceous substance. Sometimes other substances containing phosphorus in combination with a metal or base are employed; but in such cases it is frequently necessary to use, in conjunction with the carbonaceous material, silica or other acid or basic matter or salts in order to liberate the phosphorus. The cylinders or retorts are connected with condensers, and when the necessary temperature has been attained phosphorus distills over and is condensed under water. The very high temperature which has to be employed to effect complete reduction and liberation of phosphorus occasions excessive wear and breakage of the fire-clay cylinders or retorts, leading to great loss of material and largely increasing the cost of production.

My invention has for its object to diminish the wear of the apparatus and the waste and loss of materials, and in carrying out my invention, instead of applying heat to the external surface of vessels containing the phosphorus-yielding material mixed as usual with carbonaceous matter, I generate the heat within the containing-vessel and apply it directly into and through the materials themselves, at the same time maintaining a reducing atmosphere within the vessel and keeping up the temperature required for the decomposition without introducing oxidizing, reducing or other gases."

The feedstock was dried, crude phosphoric acid, or acid phosphate of lime. In 1889 technology was available to make impure phosphoric acid by acidulating phosphate ore with sulfuric acid. Lime was made by calcining limestone and the lime could be combined with phosphate ore to make monocalcium phosphate and dicalcium phosphate. It is noteworthy that in 1889 phosphate ore was not heated to obtain elemental phosphorus, but mineral fluorapatite having a $F/P_2O_5$ weight ratio in the range of 0.10 to 0.11 was reacted with sulfuric acid to obtain phosphatic materials having lower $F/P_2O_5$ ratios and was more readily smelted in the ceramic cylinders or retorts.

In 1917 the U.S. Department of Agriculture began an investigation of the smelting of phosphate ore by heating a mixture of phosphate ore, reducing carbon, and silica rock in fuel-fired furnaces ("Investigation of the Manufacture of Phosphoric Acid by the Volatilization Process," W. H. Waggaman, H. W. Easterwood and T. B. Turley, U.S. Department of Agriculture, Department Bulletin No. 1179, 1923). This experimental work culminated in a large-scale blast furnace at Nashville, Tenn. (H. W. Easterwood, *Chem. and Met. Eng.* 40,283–7, June 1933). Another plant was constructed at Pembroke, Fla., to smelt phosphate ore in a fuel-fired furnace, but this plant was operated only a short period. Following this, electric furnaces were constructed to smelt phosphate ore.

The Chemical Abstract Service searched the literature for prior art on the smelting of phosphatic materials. The following publications and patents relate to feedstock for elemental phosphorus production.

1. "New Process for Technical-grade Phosphoric Acid," Frederick Leder, C. Won, Pingwu Chang, John D. Ellis, Joseph A Megy, Robert A Hard, Harold E. Kyle, Jacob Mu, Benjamin W. Shaw, *Ind. Eng. Chem. Process Des. Dev.* (1985), 24 (3), 688–97.

In the manufacture of technical-grade $H_3PO_4$, fossil fuel was used as an energy source rather than electric power. Phosphate ore in a conventional direct-fired rotary kiln is reduced with carbon to elemental phosphorus. Burning of the phosphorus and co-produced CO provides energy for the endothermic reduction. The process was demonstrated in a 10 tons/day solids feed capacity pilot kiln, phosphate ore reductions $\leq 77\%$ being obtaining without bedding coke and $\leq 82\%$ with bedding coke. Melting and clinkering were not a limitation. A computer simulation based on lab and pilot-plant data predicted yields of $\geq 90\%$ in large commercial kilns. The quality of commercial plant acid is expected to be acceptable based on extrapolation of pilot-plant results. As an energy efficient alternative to the electric-furnace method, the process appears to provide the opportunity for significantly reducing manufacturing cost for technical-grade $H_3PO_4$.

2. "Reducing Agent,". E. P. Makov, M. T. Kopbasarov, N. V. Chepurko, L. Yankina, V. G. Prikhod'ko, K. K. Baizhanov, N. M. Bobir, Russian Patent SU115104. The reducing agent is prepared from coke fines primarily for the manufacture of phosphorus by mixing coke fines with mineral binder and the mixture is granulated. The mechanical strength of the granules is increased by pretreating the mineral binder with $H_3PO_4$ [1:(0.06–0.4) wt. ratio and mixed with coke fines at a (0.45–1.0:1 wt. ratio].

3. "Fired Phosphate Pellets," Wolfgang Kursawe, Hartmut Roth, Wolfgang Hornauer, Heinze Nikschtat, Hans Joachim Ringelham, Guenter Kalz, German Patent DD-219168A1.

Phosphate pellets for electrochemical smelting of yellow phosphorus are prepared by compacting phosphate flour with a binder, preliminary drying of green pellets in the first stage at 423–453° K to a residual moisture content of $\leq 1.2\%$, final drying and stepwise heating to 873–1173° K in the second stage, and firing at 1173–1473° K in a third stage. The amount of fines in the fired pellets is decreased from 20–35 to 5–15% as a result of the decrease of temperature in the preliminary drying stage, thus decreasing the amount of recycled materials and increasing the capacity of the drying and firing equipment.

4. "Low Volatile Fluorine Process for Making Elemental Phosphorus," John E. Stauffer, U.S. Pat. No. 4,605,540. Elemental phosphorus is manufactured by an improved electric-furnace process in which alkali (5–15 wt. %, $Na_2O$ equivalent) is added to the phosphorus ore feed, containing sand and carbon, to scavenge volatile fluorine compounds. A sodium compound, e.g., soda ash or trona, may be used, and the method results in operating efficiencies and pollution reduction.

5. "Production of Phosphorus and Phosphoric Acid," James C. Barber, U.S. Pat. No. 4,608,241.

A multistep process for treating phosphorus-containing waste, e.g., from $H_3PO_4$ plants is described. The steps include: (1) distilling the waste to separate phosphorus and water, which are condensed and separated in condensable and non-condensable gases; (2) agglomerating the residue with a binder and smelting the agglomerate in a submerged-arc furnace; (3) combining and burning the phosphorus from steps 1 and 2 to give $P_2O_5$; and (4) treating the $P_2O_5$ with water to give aqueous $H_3PO_4$. Processes are also disclosed for separating elemental phosphorus from the waste, converting the residue to granular fertilizer, and making suspension fertilizer from water containing the phosphorus. Apparatus for the processes is described in detail with diagrams and flow charts.

6. "Method of Obtaining Phosphorus," R. G. Galeev, I. R. Khairudinov, M. M. Akhmetov, N. Gimaev, G. A. Murzagaareev, V. N. Gulyaikhin, T. O. Omaraliev, Russian Patent SU370073.

Phosphorus is manufactured by reducing phosphorite with coke in an electrothermal furnace in the presence of quartzite and subsequent condensation of the phosphorus vapors. In order to improve the product yield, the reduction is carried out with petroleum coke containing 1.9–6.0 wt. % sulfur.

7. "Manufacture of Phosphorus from Phosphorites," E. S. Bugenov, Sh. Moldabekov, L. M. Volozhin, V. G. Prikhod'ko, L. A. Ashkinazi, V. P. Pushkov, T. Temirbekov, K. A. Kim, A. K. Gaifullina, U.S. Pat. No. 4,780,296.

The title process comprises (a) supplying a phosphorite ore to melting, simultaneously with feeding molten paraffin or molten $C_{20-24}$ fatty acids, (b) melting the phosphorite ore in the presence of quartzite and a reducing agent with formation of phosphorus vapor-containing flue gases, (c) cleaning and condensation of the flue gases to recover phosphorus and slime, and (d) recovering phosphorus by treating the slime, with an organic extractant selected from molten paraffin and molten $C_{16-24}$ fatty acids. This method is useful for the manufacture of phosphorus. A charge, consisting of phosphorite ore 29.0, quartzite 4.0, and coke 5.0 ton, was loaded into a continuous furnace, while 0.05 wt. % (based on phosphorite) paraffin was sprayed on the surface of the charge. While moving towards the melting zone, the charge was heated by ascending flue gases, and evaporation of the paraffin occurred at 350°. The resulting vapors, mixed with the flue gases were delivered to purification and condensation. The charge melted at 1500° in the bottom section of the furnace. At the bottom part of the condensation bath, 1.9 ton commercial phosphorus was accumulated, while the upper layer comprised 0.2 ton slime containing 0.1 ton phosphorus. The slime was extracted with 0.4 ton molten paraffin at 70°, giving a total phosphorus yield of 99.4 wt. %.

8. "Phosphorus Recovery from Phosphorus-containing Byproducts," Joseph H. Finley, Richard E. Hall, U.S. Pat. No. 4,783,328.

Phosphorus values from wet-acid raffinate and the nodule fines from an electric phosphorus furnace are recovered as elemental phosphorus by forming into briquets, heating the briquets to curing temperatures, and charging the cured briquets into the electric phosphorus furnace in the presence of coke and fluxing agent. Thus, a mixture containing 70 wt. % nodule fines and 30 wt. % burden dust was combined with a raffinate containing 27.6 $P_2O_5$ and 9.8 wt % water. Pellets were prepared at 4000 psi and cured at 200°. When tested, 27.6% of cured pellets containing a raffinate binder were abraded as compared to 100% of cured pellets without a raffinate binder.

9. "Phosphate Feed Material for Phosphorus Electric Furnace," Joseph H. Finley, U.S. Pat. No. 4,806,326.

In the manufacture of elemental phosphorus by the electric furnace method, in which the comminuted phosphate ore is compacted into shapes and calcined to give a furnace feed material of calcined phosphate nodules, the fines formed by abrasion of the phosphate nodules are mixed with comminuted phosphate ore in the presence of sufficient $H_3PO_4$ and agglomerated. Such agglomerates are made resistant to abrasion and thus generate less nodule fines.

10. "Manufacture of Phosphorus," M. R. Konevskii, R. A. Dzhurabaev, Yu. N. Vil'k, V. V. Karlin, V. N. Prokshits, Russian Patent SU 450462 A1.

Phosphorus is manufactured by reduction of raw materials containing phosphorite, a reducing agent, and a flux. To improve process efficiency, SiC is used as the reducing agent. Preferably, a mixture of $SiO_2$ and carbon is used as the reducing agent.

11. "Renewable Energy for Production of Elemental Phosphorus," James C. Barber, *Proc. Intersoc. Energy Convers. Eng. Conf.* (1989) 24th (Vol. 4), 1743–8.

Methods are proposed for use in smelting phosphate ores in submerged arc furnaces that decrease the overall energy requirement by –40%. The feed phosphate ore is agglomerated and the feed components have matching sizes for avoiding segregation in the furnace. The byproduct furnace gases of phosphate-ore smelting, consisting mainly of CO and hydrogen and having a heating value of 343 $Btu/Ft^3$ and a potential energy that is –65% of the smelting energy that is supplied as electricity, can be used to generate some of the electrical power that is used for smelting. Wood pellets can be used as the reducing carbon instead of metallurgical and petroleum coke and in firing a boiler for generating electric power for the smelting.

12. "Manufacture of Elemental Phosphorus and Phosphoric Acid, Cogeneration of Electric Energy, and Recovery of Fluoride and Phosphate-containing Waste Solutions," James C. Barber, U.S. Pat. No. 4,919,906.

Phosphate ore is upgraded by agglomerating the ore with monobasic calcium phosphate binder. Phosphorus-containing solids are fluidized and burned to form impure $H_3PO_4$ that is reacted with comminuted phosphate ore to give the bind. Gases from the agglomerator are scrubbed with condenser water to collect fluorine compounds. Scrubber effluent is treated with $NH_3$ to convert fluosilicates to $NH_4F$ and precipitate. The precipitate is added to the agglomerator to provide $SiO_2$ as flux to smelt phosphorus ore. Surplus condenser water containing $NH_4F$ and ammonium phosphate is used for the manufacture of suspension fertilizer. Phosphorus is burned, and $P_2O_5$ is hydrated to give $H_3PO_4$ and the heat of combustion and hydration is recovered as electric energy. Byproduct furnace gas is cleaned and burned in a cogeneration plant for the production of electric energy. This combination of processes conserves energy and eliminates the generation of hazardous waste.

13. "Manufacture of Phosphorus," E. S. Bugenov, Sh. M. Moldabakov, L. M. Vologhin, T. T. Tamirbekov, L. A. Ashkinazi, K. A. Kim, Russian Patent SU1560470 A1.

This process includes feeding to an electric furnace a charge consisting of phosphate rock, a flux, and a solid reducing agent, vaporizing the phosphorus at elevated temperature, separating the mineral particles from the furnace gases, and condensing the vapors to recover the phosphorus. To decrease phosphorus loss, 0.05–0.1% paraffin is added to the charge before being fed to the furnace.

14. "Manuafacture of Phosphorus," V. A. Ershov, B. A. Lavrov, A. P. Mel'nik, M. D. Beskin, N. V. Ortisheheva, I. N. Kharlamora, A. S. Slepchanko, Russian Patent SU1560471 A1.

The process includes reducing the phosphorite, in the presence of a flux, with carbon-containing solid reducing agent at elevated temperature and subsequently separating the product from the furnace gases. To increase product yield, the reducing agent has a pore volume of 0.065–0.095 $Cm^3/g$. and a pore diameter >10 $\mu m$.

15. "Conversion of Precipitator Dust into Phosphorus Furnace Feedstock," James C. Barber, U.S. Pat. No. 4,968,499.

The process for converting the precipitator dust obtained during the production of elemental phosphorus into the feedstock for the submerged-arc electric furnace comprises: (1) agglomerating the precipitator dust containing elemental phosphorus by tumbling with a binder made by the reaction of $H_3PO_4$ with finely divided phosphate ore, (2) indurating agglomerates by heating at 220–1832° F., (3) scrubbing the gases discharged from the above two steps to obtain a scrubber effluent containing fluorine compounds, particulates and elemental phosphorus, (4) using the scrubber effluent as feedstock for the production of suspension fertilizer, and (5) transporting indurated agglomerates from step (2) to a facility for the production of elemental phosphorus in a submerged arc electric furnace.

16. "Method for Phosphate Raw Material Agglomeration," Vadim A. Ershov, Bores A. Lavrov, Natalya V. Artishcheva, Audrey O. Fedotov, Igor B. Gavrilenko, Russian Patent SU4924063.

Phosphate raw materials are agglomerated by milling, mixing with preheated moisturizing agent, pelletizing, drying, and calcining. Strength of the resulting granules obtained from a low-acidity phosphate material is increased when the moisturizing agent is in the form of a mixture containing clay and a $H_3PO_4$ solution with $Al_2O_3$ and $P_2O_5$ content 3–7 wt. % and $Al_2O_3/P_2O_5$ ratio of 1:(2.5–3). The mixture is boiled for 1–10 minutes before the mixing. The resulting product is used for the manufacture of yellow phosphorus by an electrothermal process.

17. "Effect of Temperature on Resistivity of a Briquetted Charge for a Phosphorus Furnace," Huaming Yang, Aldong Tang, Chinese Journal.

This paper investigates the effect of temperature on resistivity of the furnace charge briquetted using organic binder. The experimental results show that the resistivity decreases with temperature. As compared with the traditional lump burden, the high-temperature resistivity of briquetted burden is higher, which is advantageous to electricity saving during the smelting. The mechanisms of variation of resistivity with temperature are also explored.

18. "Process for Agglomerating Carbon Particles," James C. Barber, U.S. Pat. No. 4,421,521.

A process and product of waste recovery at phosphorus furnaces is disclosed wherein small sized discrete particles of carbonaceous material or beneficiated phosphate ore are mixed with a mineral acid, an alkaline fluid and water, and the reacted mixture is tumbled in a horizontal cylinder at a temperature below that at which the carbonaceous material oxidizes to form agglomerates which are then indurated to discrete particulate size as desired for a charge component; the agglomerates are fed to a phosphorus smelting furnace together with the other materials needed to make elemental phosphorus; furnace gases are cooled with recirculating water; a side stream of water is taken off, treated, and used as feedstock in fluid fertilizers. Apparatus is disclosed for agglomerating coke and phosphate and, further, for measuring the abrasion and shatter resistance of agglomerates.

19. "Energy Conservation During the Smelting of Ores," James C. Barber, U.S. Pat. No. 4,529,439.

The invention discloses processes for preparing matched sizes of electric furnace feed materials. With the matched sizes, components of the feed mixture do not separate inside the furnace and this decreases the electric energy for smelting. Preparation of matched sizes of materials is made possible by low-temperature agglomeration followed by drying to indurate the agglomerates. Fuel requirements for induration are subsequently reduced, and environmental problems associated with high-temperature agglomerates are eliminated. Phosphate ores can be agglomerated and simultaneously the ores are upgraded by increasing the $P_2O_5$ content. Unbeneficiated phosphate ores heretofore considered unsuited for smelting can be used as phosphate sources for the production of phosphorus. A combustible gas consisting mainly of carbon monoxide and hydrogen is generated when ores are smelted. Processes are disclosed for cleaning the gas to permit it to be burned in a facility for the cogeneration of electric energy. At phosphorus furnaces the potential energy in the gas is equal to about 65 percent of the electric energy used in smelting; consequently, the net electric energy consumption can be substantially reduced by operation of a cogeneration facility.

20. "Production of Phosphorus and Phosphoric Acid," James C. Barber, U.S. Pat. No. 4,608,241.

Processes are disclosed for recovering solid wastes containing elemental phosphorus. The wastes may cause serious environmental problems at phosphorus furnaces because elemental phosphorus is toxic to marine animals. Recovery of the wastes was considered for the following:

1. At phosphorus furnace plants making phosphoric acid as one of the products, when the objective is to produce only high quality phosphoric acid;
2. At phosphorus furnace plants making elemental phosphorus as a final product, and the objective is to produce only high quality phosphorus; and
3. At plant sites where neither phosphoric acid nor phosphorus is produced.

21. "Preparation of Phosphatic Feedstock from Phosphorus-containing Waste," James C. Barber, U.S. Pat. No. 6,051,210.

Phosphorus furnaces were operated by the Tennessee Valley Authority (TVA) to produce elemental phosphorus beginning over the period 1936–1976. Elemental phosphorus was lost in phosphorus-containing waste throughout the 40 years TVA produced the element. Large quantities of phosphorus-containing wastes remain at the site where TVA produced the chemical.

Technology has not been available to treat phosphorus-containing waste so as to recover elemental phosphorus and produce an innocuous waste material. White phosphorus is a dangerous chemical and it is very toxic. Essentially all of the elemental phosphorus must be recovered if an innocuous waste is produced. Commercial processes have not been available to recover elemental phosphorus from phosphorus-containing wastes.

Elemental phosphorus is produced commercially by smelting phosphatic material in electric furnaces. A process has been invented to prepare phosphatic feedstock from phosphorus-containing waste. The waste is heated in a temperature range which will volatilize white phosphorus and convert white phosphorus into red phosphorus. Thus phosphorus-containing wastes can be safely agglomerated to prepare phosphatic feedstock. Feedstock is heated to approximately 2700° F. in electric furnaces and red phosphorus is vaporized. White phosphorus is obtained when phosphorus vapor is condensed.

22. "Remediation of Soil Polluted with Phosphorus-containing Wastes," James C. Barber, U.S. Pat. No. 6,169,222 B1.

Elemental phosphorus was produced by Tennessee Valley Authority (TVA) at Muscle Shoals, Ala., by smelting phosphatic material with carbon in electric furnaces. Solid wastes containing elemental phosphorus accumulated at the production facility as a result of TVA's operation at Muscle Shoals. Soil became polluted with elemental phosphorus from contact with phosphorus-containing wastes and remediation of the polluted soil is needed to restore land at the site to usefulness. The present invention entails agglomeration of the polluted soil by nodulizing to prepare feedstock for electric furnaces; reacting phosphoric acid with finely divided phosphate ore forming a porous, monolithic mass of monocalcium phosphate monohydrate, disintegrating the monolithic mass to form lumps; and simultaneous smelting of agglomerated soil and anhydrous monocalcium phosphate with carbon in an electric furnace. No residue of polluted soil remains but calcium silicate slag, ferrophosphorus, and carbon monoxide are produced when the polluted soil is smelted. Calcium silicate slag, ferrophosphorus, elemental phosphorus, and carbon monoxide are produced when anhydrous monocalcium phosphate is smelted.

23. "Manufacture of Phosphorus," V. N. Gulyaikhin, Russian Patent SU1623949 A1.

The process comprises feeding a lumpy charge containing phosphorite, quartzite and coke into an electrothermal furnace, feeding carbonaceous material through hollow electrodes, melting the charge in the furnace bath, and removing dust from the furnace gases by electrostatic precipitation. The loss of phosphorus is decreased when the outside/inside diameter ratio of the electrodes is 0.3–0, 0.7:1 (sic) and the height of the carbonaceous material in the electrodes is not less than the height of the furnace bath.

24. "Charge for Manufacture of Phosphorus," A. G. Grinshpunt, V. V. Kashkul, V. F. Lysenko, V. N. Gulidov, Russian Patent SU 163938 A1.

The degree of reduction of phosphate raw material in phosphorus manufacture is increased when the charge comprises waste from graphitization of electrodes (0.5–10) in addition to coke (3–13), quartzite (2–8 wt %) and the phosphate raw material The waste contains Si, $SiO_2$, and SiC.

25. "Purification of Yellow Phosphorus," N. P. Romasheva, A. N. Paivinoba, N. L. Lukinykh, Yu. M. Trofimov, Yu. V. Shjarnpa, V. V. Barlyboev, O. P. Grebennikov, Russian Patent SU 1648899 A1.

The process includes treating yellow phosphorus with an aqueous solution containing an inorganic agent under heating and mixing followed by separating out phosphorus. The process is shortened and work safely increased when an Fe(III) salt is used as the agent at a Fe/As ratio of 1:(40–80), and the process is performed for 3–9 hours at a mixing rate of 30–90 rpm and 55°–85°.

26. "Process and Apparatus for the Purification of White Phosphorus with Activated Carbon," Jean Claude Legrand, Paul Bourdaudueq, Thierry Bulinge, European Patent Application EP-493173.

In this process comprising introducing an aqueous suspension of activated carbon and white phosphorus into a reactor and recovering the white phosphorus in a separations process, the suspension is decanted before separating the purified white phosphorus from the activated carbon to obtain an aqueous phase and a phosphorus phase, the phosphorus phase is transferred to a separation zone in which the white phosphorus isseparatedd from the activated carbon, an aqueous suspension is formed of the purified white phosphorus, and the water is removed from the suspension in a calcination zone. The apparatus is described with a schematic flow diagram. This process is used in the manufacture of phosphorus from phosphates by reduction with carbon in the presence of $SiO_2$ in an electric furnace, it eliminates phosphorus losses, and the resulting high-purity phosphorus contains <50 ppm organic material.

27. "Manufacture of High-purity Phosphorus," Rikito Sato, Takeshi Masugaki, Japanese Patent 91 0276332.

Crude phosphorus is melted, mixed with $HNO_3$ at 46°–53°, preferably 48°–50°, to dissolve impurities, e.g., arsenic, and cooled to recover high-purity phosphorus. The mixing container is equipped with internal and external cooling devices to maintain the temperature of the liquid in the central part, side part, and bottom party at 46°–53°. The yield of high-purity phosphorus is increased.

EXAMPLE 1

When phosphate ore was beneficiated by washing, it is heated in rotary kilns to the temperature range of 2600° to 2730° F. to decompose carbonates and volatilize carbon dioxide and volatile water of hydration. The process is called nodulizing. Clay is not completely removed by washing and the residual clay melts forming a fluid that is a binder to agglomerate the small particles. Florida pebble phosphate, however, does not contain clay and it has to be heated to about 2900° F., or higher, to melt some silica and obtain a liquid phase for agglomeration. Refractory in the rotary kilns is attacked by phosphate at the higher nodulizing temperature and the kiln warps causing refractory to dislodge and fall out. Producers of elemental phosphorus depending on Florida pebble for feedstock smelt this lump ore without calcining or agglomerating.

Unbeneficiated phosphate ore, containing more clay than the washed ore, can be nodulized in the temperature range of 2200° F. to 2500° F. and the energy requirement is less than it is for the beneficiated ore. The clay permits the ore to be agglomerated by briquetting, compacting, or pelletizing prior to heating to decompose carbonates and volatize water of hydration. Agglomerates formed with a clay binder are weak until they are indurated. Traveling grate kilns, shaft kilns, or a combination of travelling grate and rotary kilns can be used to heat raw phosphate ore when the ore is agglomerated prior to induration, or the raw phosphate ore may be calcined and agglomerated in a rotary kiln.

EXAMPLE 2

The mineral fluorapatite in phosphate ores contains 3.77 percent fluorine, 42.2 percent $P_2O_5$ and the weight ratio of fluorine to $P_2O_5$ is 0.089. In most phosphate ores, however, the fluorine to $P_2O_5$ ($F/P_2O_5$) weight ratio is up to 50 percent higher than it is in fluorapatite because part of the phosphate normally present in the mineral has been replaced by carbonate and fluorine. Phosphate ore mined in middle Tennessee, for example, has a $F/P_2O_5$ weight ratio of 0.105.

The fluorapatite mineral does not readily lose fluorine by heating. This mineral has to be heated to temperatures well above 2000° F. before significant amounts of fluorine volatilize. However, commercial phosphates begin to lose fluorine at temperatures well below 2000° F. because the nonapatitic fluoride in the ore is more readily volatilized.

When beneficiated phosphate ore having a $F/P_2O_5$ weight ratio of 0.105 is heated and agglomerated in the temperature range 2600° F. to 2730° F., 35 to 40 percent of the fluorine is volatilized and the $F/P_2O_5$ weight ratio is reduced to 0.089 which is the ratio in stable fluorapatite. When the phosphate ore heated to 2600° F. to 2730° F. is smelted in an electric furnace, 91.4 percent of the fluorine is recovered in the slag and 9.1 percent is recovered in phosphorus sludge. Crystalline deposits do not accumulate on the frames and collecting electrodes of the electrostatic precipitator.

EXAMPLE 3

Unbeneficiated phosphate ore from mines in middle Tennessee and having a $F/P_2O_5$, weight ratio of about 0.105 is heated to temperatures in the range of 2200° F. to 2500° F. to calcine and agglomerate the phosphatic material. The phosphatic material could be agglomerated at lower temperature because it contains more clay than beneficiated phosphate ore. Only about eight percent of the fluorine is volatilized and the calculated $F/P_2O_5$ weight ratio in the feedstock is 0.097 as compared with a ratio of 0.089 for heating in the temperature range 2600° F. to 2730° F. When the feedstock that had been heated to the temperature range 2200° F. to 2500° F. is smelted in electric furnaces it is evident more flourine is volatilized than for feedstock that had been heated to the temperature range 2600° F. to 2730° F., although a material balance is not determined.

EXAMPLE 4

Uncalcined and unagglomerated Florida hard rock is smelted in an electric furnace to investigate its smelting characteristics. The Florida hard rock has the following chemical composition: moisture, 1.7 percent; $P_2O_5$, 35.4 percent; CaO, 51.1 percent; $SiO_2$, 2.7 percent; $Fe_2O_3$, 1.0 percent; $Al_2O_3$, 0.8 percent; $CO_2$, 3.2 percent; and F, 3.9 percent. The $F/P_2O_5$ weight ratio is 0.110 and the percent P O in the phosphate-plus-silica is 27.2.

The smelting of Florida hard rock is compared with the smelting of feedstock that has been prepared from beneficiated raw phosphate ore from mines in middle Tennessee and has?? been heated in the temperature range of 2600° F. to 2700° F. The feedstock has the following chemical composition: moisture, 0.0 percent; $P_2O_5$, 29.7 percent; $SiO_2$, 18.8 percent; CaO, 41.7 percent; $Fe_2O_3$, 3.6 percent; F, 2.3 percent. The $F/P_2O_5$ weight ratio is 0.077 and the percent $P_2O_5$ in the phosphate-plus-silica is 25.7.

Furnace operation is more erratic with uncalcined Florida hard rock than it is with the beneficiated phosphate ore that had been heated to temperatures in the range of 2600° to 2700° F.; the furnace pressure fluctuations are greater; the slag is more viscous and harder to tap and operation of the electrostatic precipitator is unsatisfactory. Deposits accumulate on the wires and frames of the precipitator after 1 month's time and causes electrical short circuits which are not readily remedied by shaking and vibrating the frames. Inspection shows that some of the deposits are crystalline projections extending horizontally from the wires, and analysis shows that they consist principally of $P_2O_5$ and $SiO_2$.

Four percent excess coke is added (instead of the 3 percent used with the fedstock prepared from beneficiated phosphate ore) and the $SiO_2/CaO$ weight ratio is increased to 0.83 in order to reduce the $P_2O_5$ content of the slag to less than 1 percent and because the normally used ratio of 0.75 to 0.80 causes the slag to be viscous and tapping difficult. The extra coke required with the uncalcined Florida hard rock is attributed to moisture and carbon dioxide that consumed carbon by the following reactions.

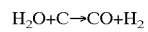

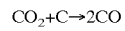

The need to add extra $SiO_2$ to increase the $SiO_2/CaO$ weight ratio is attributed to loss of silicon as gaseous silicon tetrafluoride ($SiF_4$). This loss as $SiF_4$ resulted from the high $F/P_2O_5$ weight ratio (0.110) in the feedstock. However, the $SiF_4$ is recovered in the precipitator dust and phosphorus sludge and recycling these phosphorus-containing wastes will correct silicon loss during smelting.

The smelting of Florida hard rock with the high percentages of $P_2O_5$ in the phosphate-plus-silica and $F/P_2O_5$ weight ratio led to the following conclusions:

Electrostatic precipitators are unsuited for removing particulates from the furnace gas unless the problem of accumulation of crystalline deposits on the wires and frames can be corrected.

The smelting of uncalcined phosphatic feedstock containing moisture and carbonates requires more electric energy for smelting than does calcined feedstock.

EXAMPLE 5

In a TVA publication "Phosphorus Furnace Operations; How Are They Affected by Various Types of Phosphate Charges?" J. C. Barber and E. C. Marks, *Journal of Metals*, December 1992, the effect of clay in the feedstock was reported as follows:

"The use of phosphate containing a large amount of clay impurities adversely affects the furnace performance, even though the phosphate is well calcined and indurated. The additional impurities in the phosphate cause the quantity of slag produced to be increased, the electrodes to rise, and the gas temperature to increase. Extra energy is required for smelting the ores containing the larger amount of impurities. Operations at TVA have indicated that a decrease of 1 percent in the $P_2O_5$ content of the phosphate-plus-silica mixture causes the electrical energy consumption to increase about 2.5 percent. This increase in electrical energy consumption is attributed to the larger amount of slag produced and to energy required for the reduction of iron oxide in the phosphate.

A decrease of one percent $P_2O_5$ in the phosphate-plus-silica increases the electric energy for smelting 2.5 percent and an increase of one percent $P_2O_5$ in the phosphate-plus-silica reduces the electric energy 2.5 percent.

EXAMPLE 6

When a mixture of phosphatic feedstock, reducing carbon, and silica is smelted by heating in the temperature range of 2370° to 2730° F., a gaseous mixture of carbon monoxide, elemental phosphorus, and hydrogen is formed. Also, the gaseous mixture contains silicon tetrafluoride. Extremely fine-grained particulates mixed with fragments (about 1 mm. in size) of reducing carbon, phosphatic material and slag are in the gaseous mixture of carbon monoxide, elemental phosphorus, and hydrogen. Most of the particulates, however, are particles approximately 2 microns or smaller in size.

Electrostatic precipitates are provided to clean the gaseous mixture prior to cooling and condensing elemental phosphorus, and decrease the formation of phosphorus sludge. However, electrostatic precipitators do not collect all particulates; some particulates remain in the gaseous mixture and are recovered in phosphorus sludge.

The amounts and qualities of yellow phosphorus and phosphorus sludge are determined for a 72 hour test period with the precipitator operating and then with power turned off the precipitator. The proportions of phosphorus sludge are 27.8 percent of the total phosphorus without power on the electrostatic precipitator and 10.0 percent with the electrostatic precipitator operating. The percentages of elemental phosphorus in the yellow phosphorus is 96.4 with the power turned off and 98.9 with power on the electrostatic precipitators.

EXAMPLE 7

The gaseous mixture of carbon monoxide, elemental phosphorus, and hydrogen obtained by smelting phosphatic feedstock is normally contacted with water to cool the gaseous mixture adiabatically and condense elemental phosphorus and obtain yellow phosphorus. Gaseous silicon tetrafluoride combines with water by the following equation:

$$3SiF_4 + 2H_2O \rightarrow 2H_2SiF_6 + SiO$$

Thus fluosilicic acid ($H_2SiF_6$) solution and gelatinous silicon dioxide are formed. Some of the elemental phosphorus condenses as phosphorus sludge containing fluosilicic acid ($H_2SiF_6$) and gelatinuous silicon dioxide. Some of the gaseous elemental phosphorus condenses as phosphorus sludge and it is an emulsion comprised of water, particles od yellow phosphorus, and inorganic particulates.

At TVA the mixture of water, yellow phosphorus, and phosphorus sludge drains into a sump with three compartments separated by two partitions. The mixture of water, yellow phosphorus, and phosphorus sludge drains into one of the end compartments where the heavier yellow phosphorus collects and is pumped to a storage tank by a sump pump. The less dense water and phosphorus sludge overflows the partition into the middle compartment where the phosphorus sludge collects and it is pumped to a storage tank by a sump pump. Water overflows a partition into the other end of the compartment. The water is neutralized with an alkali and it is recirculated to the condenser to cool the gas mixture.

An opening is made in the partition between the yellow phosphorus and phosphorus compartments so that no separation of yellow phosphorus and phosphorus sludge is made in the sump. The mixture of yellow phosphorus and phosphorus sludge, and water is pumped out to a storage tank by a centrifugal sump pump thereby washing the yellow phosphorus and coalescing particles of elemental phosphorus in the mixture. The denser yellow phosphorus separates as a liquid layer in the storage tank.

The storage tank is equipped with a sump pump and a sight glass is installed in the piping so that the color of the fluid pumped out of the tank could be observed. The yellow bottom layer of phosphorus is pumped to the phosphorus storage tank. Phosphorus sludge is black and, when a black fluid is observed in the sight glass, the fluid is pumped to a phosphorus sludge storage tank. Thus yellow phosphorus and phosphorus sludge are separated and they are stored in their respective storage tanks.

Phosphorus in the yellow phosphorus storage tank contains 98.9 percent elemental phosphorus, yellow phosphorus containing a minimum of 98 percent elemental phosphorus is called white phosphorus and white phosphorus can be burned in a stainless steel phosphoric acid production unit without extensive corrosion of the stainless steel.

The phosphorus sludge contains 31.3 percent elemental phosphorus. Phosphorus sludge can be burned in a phosphoric acid production unit constructed of carbon and graphite without excessive corrosion. Black, impure phosphoric acid is obtained. However, phosphorus sludge should contain a minimum of 60 percent elemental phosphorus for complete oxidation of phosphorus to $P_2O_5$. Some white phosphorus containing 98.9 percent elemental phosphorus can be mixed with phosphorus sludge containing 31.3 percent elemental phosphorus to obtain a mixture containing 60 percent elemental phosphorus. The following equation applies for one ton of phosphorus sludge and X ton of white phosphorus:

$$0.313 + 0.989X = 0.600 + 0.600X$$

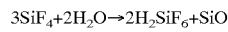

$X=0.738$ ton of white phosphorus containing 98.9 percent elemental phosphorus which will be added to one ton of phosphorus sludge containing 31.3 percent elemental phosphorus to prepare a white phosphorus-phosphorus sludge mixture containing 60 percent elemental phosphorus.

EXAMPLE 8

Pressure fluctuations on the electric furnaces cause air inleakage and elemental phosphorus in the gaseous mixture of carbon monoxide, elemental phosphorus and hydrogen is oxidized forming $P_2O_5$. When the gaseous mixture is contacted with water to condense elemental phosphorus, $P_2O_5$ is hydrated forming phosphoric acid solution. At TVA the water is neutralized with ammonia to prepare ammonium phosphate solution and the water containing ammonium phosphate is recycled to the condenser. Accordingly, the liquid mixture of yellow phosphorus and phosphorus sludge is washed with ammonium phosphate solution which is a detergent.

EXAMPLE 9

Phosphate ore is beneficiated by washing and by flotation to upgrade the ore. The upgraded ore is called flotation concentrate. The upgraded phosphate ore is ground and digested with sulfuric acid to form phosphoric acid and gypsum ($CaSO_4 \cdot 2H_2O$). The phosphoric acid and gypsum are separated by filtration; phosphoric acid is the filtrate and gypsum is the residue. However, phosphoric acid is relatively dilute and it must be concentrated in evaporators to use it for fertilizers. Some gypsum dissolves in the diluted acid and it precipitates when the diluted acid is clarified by settling in tanks and a mixture of phosphoric acid and precipitated gypsum settles out; it is an unwanted byproduct called phosphoric acid sludge. Clarified phosphoric acid is the primary product and it is called wet-process phosphoric acid. Wet-process phosphoric acid is reacted with ground flotation concentrate to prepare monocalcium phosphate monohydrate that is used for fertilizer and is called triple superphosphate fertilizer.

TVA prepares monocalcium phosphate monohydrate for fertilizer by reacting phosphoric acid with beneficiated phosphate ore. The phosphoric acid is prepared by smelting phosphate ore to obtain elemental phosphorus, the phosphorus is burned in air to make $P_2O_5$, and the $P_2O_5$ is combined with water to obtain phosphoric acid. Phosphoric acid sludge is not an unwanted byproduct as it is when wet-process phosphoric acid is produced. Furthermore, phosphoric acid produced by smelting phosphate ore is sufficiently concentrated to react with ground phosphate to produce monocalcium phosphate monohydrate without further concentration. Phosphoric acid produced at TVA is reacted with ground, beneficiated phosphate ore to prepare monocalcium phosphate monohydrate, and this fertilizer is called concentrated superphosphate.

EXAMPLE 10

Figure 2:
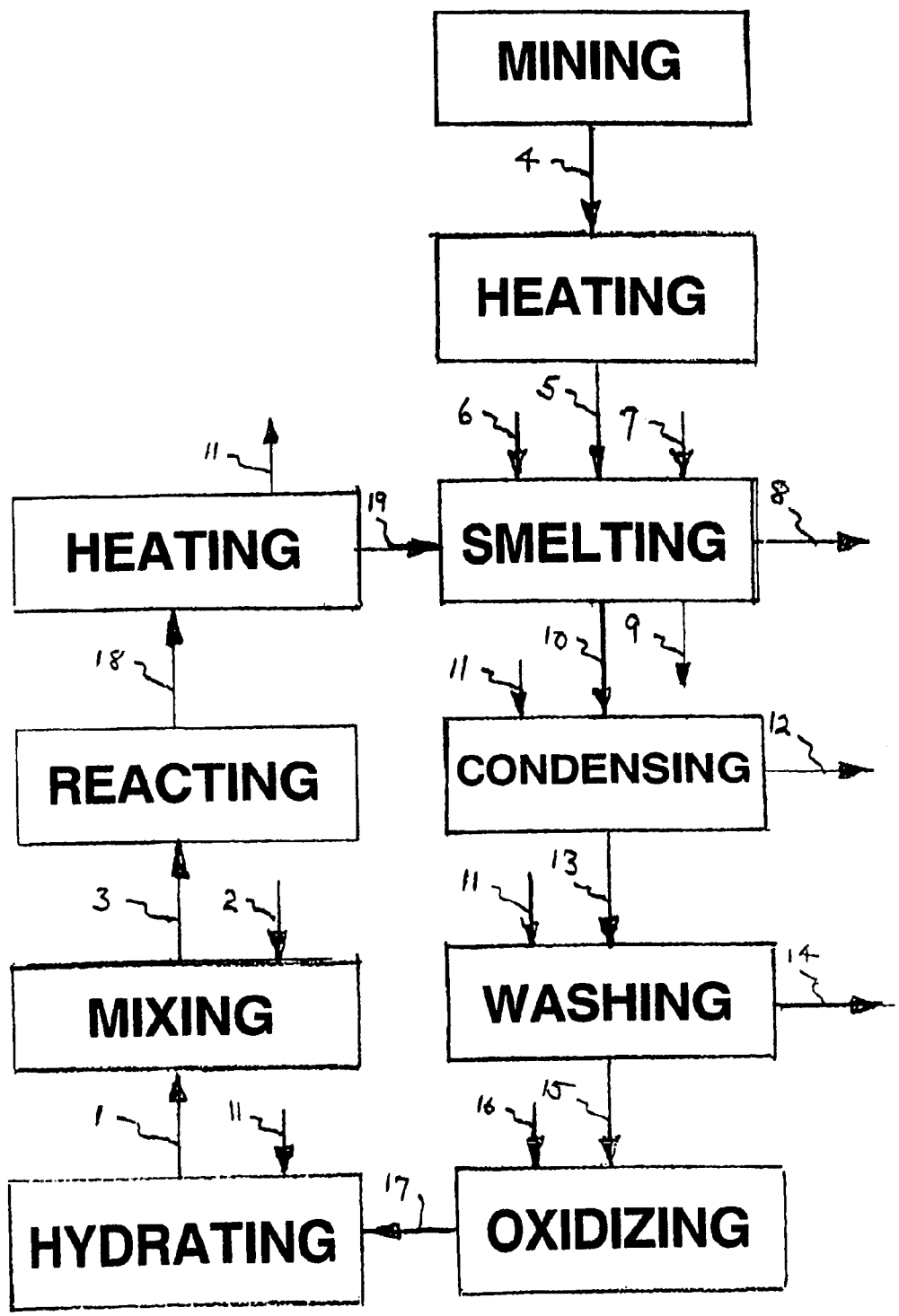
FIG. 2 is a diagram of a process for upgrading feedstock prepared from a raw phosphate ore. Raw phosphate ore 4 obtained by mining is heated to volatilize carbonates and to agglomerate the ore. Thus, agglomerated phosphate ore 5 is feedstock for smelting.

Concentrated superphosphate fertilizer is produced at TVA by mixing phosphate acid with ground, beneficiated phosphate ore in a cone mixer. Phosphate ore that had been beneficiated by washing, or by washing and flotation, is reacted with the phosphoric acid to produce the fertilizer. A slurry is formed by mixing in a cone mixer shown in FIG. 2 and the slurry is discharged on a conveyor belt where partial reaction between the phosphoric acid and phosphate occurs. The slurry sets up into a monolithic mass on the conveyor belt. The mass is broken and stored for two to three months for completion of the reaction between phosphoric acid and phosphate ore. After storage, piles of monocalcium phosphate monohydrate are consolidated in another monolithic mass that requires blasting for recovery from the piles. The monocalcium phosphate monohydrate is crushed and placed in bags labeled "Concentrated Superphosphate Fertilizer."

EXAMPLE 11

Beneficiated phosphate ore that is mined in Tennessee and washed to upgrade the ore is acidulated in the laboratory with different proportions of phosphoric acid. The composition of the beneficiated phosphate ore is as follows: moisture, 0.7 percent; $P_2O_5$, 32.9 percent; CaO, 45.9 percent; $Fe_2O_3$, 2.6 percent; $Al_2O_3$, 3.2 percent; $SiO_2$, 10.0 percent; and F, 3.48 percent. After acidulation and storage for 56 days, the acidulates have the composition in Table 4.

TABLE 4

COMPOSITION OF ACIDULATED MIXTURES OF PHOSPHATE AND PHOSPHORIC ACID

| | Acidulation | | Composition, Percent | | | | |
|---|---|---|---|---|---|---|---|
| $P_2O_5$/CaO Mole Ratio | $P_2O_5$ from Acid/$P_2O_5$ from Phosphate | Moisture | Free Acid $P_2O_5$ | Total $P_2O_5$ | CaO | F | F/$P_2O_5$ |
| 0.430 | 0.52 | 2.6 | 0.43 | 39.2 | 36.0 | 2.68 | 0.0684 |
| 0.609 | 1.15 | 3.1 | 1.49 | 43.6 | 28.3 | 2.24 | 0.0514 |
| 0.776 | 1.74 | 4.9 | 1.85 | 46.4 | 23.6 | 1.74 | 0.0375 |
| 0.949 | 2.35 | 4.7 | 1.96 | 49.0 | 20.4 | 1.53 | 0.0375 |
| 1.081 | 2.82 | 7.0 | 3.98 | 49.6 | 18.1 | 1.30 | 0.0262 |

The acidulation experiments are part of an experimental program at TVA to determine the optimum operating conditions for production of concentrated superphosphate fertilizer. For continuous production of concentrated superphosphate by mixing in the cone mixer, the optimum $P_2O_5$/CaO mole ratio is 0.975 for phosphate mined in Tennessee and 0.92 for phosphate mined in Florida. The present interest in acidulation is for upgrading feedstock and the higher $P_2O_5$/CaO mole ratios 0.949 and 1.081 are preferred. It is concluded, therefore, that the acidulation ratio should be about 1.00 to obtain monocalcium phosphate monohydrate containing about 49.3 percent $P_2O_5$ and 5.9 percent moisture.

For production of fertilizers, the monocalcium phosphate monohydrate is not heated to temperatures high enough for complete drying or for volatilizing the mole of water of hydration. Heating to higher temperatures would cause $P_2O_5$ reversion to insoluble $P_2O_5$ and this would decrease the fertilizer value. However, the monocalcium phosphate monohydrate can be heated to 225° F. to obtain anhydrous material and to volatilize the mole of water of hydration if it is used to upgrade feedstock. The total $P_2O_5$ will be increased from 49.3 percent to 55.9 percent by heating to 225° F. to obtain anhydrous monocalcium phosphate and by volatilizing the mole of water of hydration.

EXAMPLE 12

When the mole of water of hydration is volatilized, monocalcium phosphate has the chemical formula $CaH_4(PO_4)_2$, and the formula can be expressed $CaO.P_2O_5.3H_2O$. Heating to about 425° F. will volatilize one mole of water and $CaO.P_2O_5.2H_2O$ is obtained. Heating to about 610° F. will volatilize another mole and $CaO.P_2O_5.H_2O$ is obtained. Finally, heating to about 800° F. will volatilize the third mole of water and calcium metaphosphite, $Ca(PO_3)_2$ or $CaO.P_2O_5$, is obtained.

Having thus described the invention, the following is claimed:

1. A process for upgrading phosphatic feedstock prepared from raw phosphate ore, said process comprising the steps:
   (a) heating said phosphate ore having a F/$P_2O_5$ weight ratio of about 0.105 to the temperature range of 2200° F. to 2500° F. in a rotary kiln, a traveling-grate kiln, a shaft kiln or a combination of a traveling-grate kiln and a rotary kiln, to volatilize fluorine and obtain a F/$P_2O_5$ weight ratio of about 0.097;
   (b) combining the heated phosphate ore from step (a) with anhydrous monocalcium phosphate, reducing carbon, and silica to form a mixture;
   (c) heating the mixture from step (b) at a temperature in the range of 2600° F. to 2730° F. in an electric furnace in the absence of air to form a gaseous mixture comprising carbon monoxide, elemental phosphorus, and hydrogen plus calcium silicate slag and ferrophosphorus;
   (d) contacting the gaseous mixture comprising carbon monoxide, elemental phosphorus, and hydrogen from step (c) with water to condense elemental phosphorus forming a liquid mixture of water, yellow phosphorus, and phosphorus sludge and a gaseous mixture of carbon monoxide and hydrogen;
   (e) washing the liquid mixture of water, yellow phosphorus, and phosphorus sludge from step (d) with water thereby coalescing particles of yellow phosphorus and obtaining white phosphorus, phosphorus sludge, and a gaseous mixture of carbon monoxide and hydrogen;
   (f) burning the gaseous mixture of carbon monoxide and hydrogen from step (e) as a fuel;
   (g) oxidizing the phosphorus sludge from step (e) with air to obtain $P_2O_5$;
   (h) combining the $P_2O_5$ from step (g) with water to obtain orthophosphoric acid solution;
   (I) mixing the orthophosphoric acid solution from step (h) with beneficiated phosphate ore in a cone mixer to obtain a slurry and discharging said slurry on a conveyor belt;
   (j) reacting said orthophosphoric acid solution with said beneficiated phosphate ore while on the conveyor belt of step (I) thus forming a monolithic mass of monocalcium phosphate monohydrate;

(k) heating the monocalcium phosphate monohydrate from step (j) to at least 225° F. to volatilize water of hydration and excess water to obtain anhydrous monocalcium phosphate; and (I) combining the anhydrous monocalcium phosphate from step (k) with the heated phosphate ore, reducing carbon, and silica in step (b) to upgrade feedstock for smelting in an electric furnace.

2. The process of claim 1 wherein the phosphatic feedstock is prepared from raw phosphate ore containing 19 to 25 percent $P_2O_5$ with a weighted average of about 21 percent $P_2O_5$.

3. The process of claim 1 wherein the mixture resulting from step (b) is heated in an electric furnace and particulates in the step (c) gaseous mixture comprising carbon monoxide, elemental phosphorus, and hydrogen are collected in an electrostatic precipitator before said gaseous mixture is contacted with water in step (d).

4. The process of claim 1, wherein the monocalcium phosphate monohydrate of step (k) is further heated to a temperature of 425° F. to volatilize moisture, volatilize the mole of water of hydration, and volatilize one mole of combined water to obtain $CaO.P_2O_5.2H_2O$.

5. The process of claim 1 wherein the monocalcium phosphate monohydrate of step (k) is further heated to a temperature of 610° F. to volatilize moisture, volatilize the mole of water of hydration, and volatilize two moles of combined water to obtain $CaO.P_2O_5.H_2O$.

6. The process of claim 1, wherein the monocalcium phosphate monohydrate of step (k) is further heated to a temperature of 800° F. to volatilize moisture, volatilize the mole of water of hydration, and volatilize the three moles of combined water to obtain $CaO.P_2O_5$.

* * * * *